United States Patent
Huang et al.

(10) Patent No.: US 11,275,638 B1
(45) Date of Patent: Mar. 15, 2022

(54) SYSTEMS AND METHODS FOR STORING DEBUG INFORMATION

(71) Applicant: QUANTA COMPUTER INC., Taoyuan (TW)

(72) Inventors: Chun-Ping Huang, Taoyuan (TW); Kuo-Chun Liao, Taoyuan (TW); Chih-Hsiang Hsu, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 17/190,147

(22) Filed: Mar. 2, 2021

(51) Int. Cl.
*G06F 11/00* (2006.01)
*G06F 11/07* (2006.01)
*G06F 13/16* (2006.01)
*G06F 9/4401* (2018.01)

(52) U.S. Cl.
CPC ...... *G06F 11/0787* (2013.01); *G06F 11/0751* (2013.01); *G06F 11/0778* (2013.01); *G06F 13/1668* (2013.01); *G06F 9/4401* (2013.01)

(58) Field of Classification Search
CPC ............. G06F 11/0787; G06F 11/0751; G06F 11/0778; G06F 13/1668; G06F 9/4401
USPC ........................................................ 714/1–57
See application file for complete search history.

(56) References Cited

U.S. PATENT DOCUMENTS

| | | | | |
|---|---|---|---|---|
| 9,934,045 | B1* | 4/2018 | Maniapat | G06F 9/4401 |
| 2006/0015781 | A1* | 1/2006 | Rothman | G06F 11/2028 |
| | | | | 714/100 |
| 2010/0250987 | A1* | 9/2010 | Furukawa | G06F 1/3203 |
| | | | | 713/323 |
| 2013/0219369 | A1* | 8/2013 | Rector | G06F 11/362 |
| | | | | 717/127 |
| 2014/0068144 | A1* | 3/2014 | Fai | G06F 12/0246 |
| | | | | 711/103 |
| 2014/0101371 | A1* | 4/2014 | Nguyen | G06F 3/0616 |
| | | | | 711/103 |
| 2017/0102889 | A1* | 4/2017 | Lobo | G06F 11/362 |
| 2018/0253369 | A1* | 9/2018 | O'Dowd | G06F 11/3096 |
| 2019/0033946 | A1* | 1/2019 | Sultenfuss | G06F 1/3212 |
| 2019/0064849 | A1* | 2/2019 | O'Hara | G05D 1/0297 |
| 2020/0020412 | A1* | 1/2020 | Biberidis | G01R 33/072 |
| 2020/0356380 | A1* | 11/2020 | Kelly | G06F 11/3051 |

* cited by examiner

*Primary Examiner* — Sarai E Butler
(74) *Attorney, Agent, or Firm* — Nixon Peabody LLP

(57) ABSTRACT

A system and method that allows debugging data to be stored without slowing down initialization is disclosed. The system includes a processor, a firmware read only memory (ROM), and a first memory device coupled to the firmware ROM. The firmware ROM can be a BIOS ROM. The first memory device is configured to store debug information from the firmware ROM prior to running an operating system on the processor. Having the firmware ROM store the debug information on the first memory device allows debug information associated with the firmware to be easily accessible without needing a debug firmware or a cable to receive outputs of the debug firmware.

19 Claims, 6 Drawing Sheets

| | POST Time | Console Output Size |
|---|---|---|
| Debug BIOS | 3 min 45 sec | 1.8 MB |
| Formal BIOS | 1 min | 0 MB |
| Partial Debug BIOS | 1 min 30 sec | 0.3 MB |
| Formal BIOS with additional memory | 1 min 45 sec | 1.8 MB |

402  400                                    220  410

Stored Information After 1st Boot

Stored Information After 2nd Boot 404      406

FIG. 4B

| | POST Time | Console Output Size |
|---|---|---|
| Debug BIOS | 3 min 45 sec | 1.8 MB |
| Formal BIOS | 1 min | 0 MB |
| Partial Debug BIOS | 1 min 30 sec | 0.3 MB |
| Formal BIOS with additional memory | 1 min 45 sec | 1.8 MB |

FIG. 5

SYSTEMS AND METHODS FOR STORING DEBUG INFORMATION

TECHNICAL FIELD

The present disclosure relates generally to capturing debug information within computing systems. More particularly, systems and methods for storing debug information on a local storage device of a computing system are disclosed.

BACKGROUND

Computing systems are used in different contexts for a wide range of functions. Some computing systems operate on batteries and may require low-power operation to conserve charge on the batteries. On the other hand, some computing systems may be plugged into a power outlet, and low-power operation is not as important as computing performance. Many computing systems balance performance and power consumption, even when plugged into a power outlet. No matter what type of computing system is used, the computing system is typically initialized when powered up. Computing systems with more capable resources typically perform initialization steps quicker than computing systems with less capable resources. For example, a desktop computer with a faster processor and faster hard drive will boot up faster than a desktop computer with a slower processor and a slower hard drive. Sometimes a specific hardware component can be a limiting factor in how fast a computing system initializes. For example, a desktop computer with a solid state drive will boot up faster than a desktop computer with a magnetic hard drive.

Minimizing boot times or initialization times of computing systems is a goal of the computing industry. Users of computing systems do not like to wait while the computing systems initialize, because any time lost to initialization means loss of productivity. Furthermore, users with typical attention spans can forget why the computing systems were initialized in the first place. Thus, computing systems are typically optimized to boot up quickly. Another motivation for reducing boot-up time is to minimize downtime, since the computing system is listed as being down or offline during boot-up. A computing system that is offline cannot enhance or contribute to a user's productivity. For example, an offline server does not process computing jobs. Thus, submitted computing jobs either have to wait for the server to come online or be sent to another server.

Firmware and subsystems used in computing systems, or other embedded systems have similar downtime issues, as discussed above with computing systems in general. Thus, boot-up time is optimized for these systems as well. In optimizing boot-up times, debug information is not generated. If there is a problem while firmware is initializing, the debug information is typically unavailable until the firmware's operating system is running. Therefore, there is little to no guidance provided to a technician or user in resolving problems that may present themselves during initialization. Computing system manufacturers typically build two versions of a system, a debug version and a release version. The release version is built to mute debug information, while the debug version is built to output debug information. The release version boots up faster than the debug version due to the debug information being excluded from the boot process. The present disclosure is directed at solving problems related to capturing debug information in a release version while maintaining reasonable boot times.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter; nor is it intended to be used in isolation to determine the scope of the claimed subject matter. The subject matter should be understood by reference to appropriate portions of the entire specification of this disclosure, any or all drawings and each claim.

Some implementations of the present disclosure provide a system including a processor, a firmware read only memory (ROM), and a first memory device coupled to the firmware ROM. The first memory device is configured to store debug information from the firmware ROM prior to running an operating system on the processor. In an implementation, the system further includes a chipset coupled to the processor via a first bus and coupled to the firmware ROM and the first memory device via a second bus. In an implementation, the first memory device is an electrically erasable programmable ROM or a NOR flash ROM. In an implementation, the debug information is stored in consecutive memory locations on the first memory device. In an implementation, the debug information includes first and second debug information, and the first debug information stored on the first memory device is partially overwritten by the second debug information.

In an implementation, the debug information includes an offline dump. In an embodiment, the system further includes a network interface configured to send the debug information on the first memory device to an external device. In an implementation, the system further includes a second memory device having a higher capacity than the first memory device. The second memory device is configured to store system event logs generated by the operating system. In an implementation, the second memory device includes a random access memory, a hard drive, or both. In an implementation, the firmware ROM is a basic input out system (BIOS) ROM.

Some implementations of the present disclosure include an embedded system. The embedded system includes a microprocessor, a firmware ROM, and a memory device coupled to the firmware ROM. The memory device is configured to store debug information from the firmware ROM prior to initializing the microprocessor. In an implementation, the memory device is an electrically erasable programmable ROM or a NOR flash ROM. In an implementation, the debug information is stored in consecutive memory locations on the memory device. In an implementation, the debug information includes first debug information and second debug information. The first debug information is stored on the memory device is partially overwritten by second debug information.

Some implementations of the present disclosure provide a method for storing debug information on a computing system. The debug information is generated using a firmware ROM of the computing system. The generated debug information is stored on a memory device of the computing system, the memory device being accessible by the firmware ROM. The stored debug information is sent to an external device using a network interface of the computing system. In an implementation, the debug information is stored in consecutive memory locations on the memory device. In an implementation, subsequent debug information is generated using the firmware ROM. The subsequent debug information is stored by partially overwriting the debug information. In an implementation, the memory device includes an electrically erasable programmable ROM or a NOR flash ROM. In an implementation, the firmware ROM is a BIOS ROM.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of embodiments together with reference to the accompanying drawings, in which:

FIG. 4A illustrates a first state of additional memory after a first boot process, according to some implementations of the present disclosure;

FIG. 4B illustrates a second state of the additional memory of FIG. 4A after a second boot process; and FIG. 5 is a table providing comparison of boot times between different device configurations, according to some implementations of the present disclosure.

Figure 1:
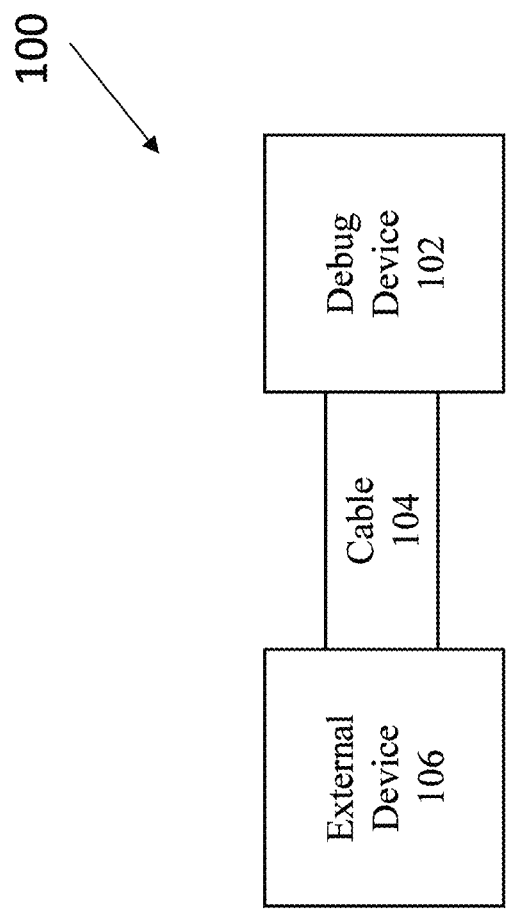
FIG. 1 illustrates a debugging setup in the prior art.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

With regards to the present disclosure, the terms "computing device" or "computing system" or "computer system" or "computer" refer to any electronically-powered or battery-powered equipment that has hardware, software, and/or firmware components, where the software and/or firmware components can be configured for operating features on the device.

Formally released basic input output system (BIOS) of computing systems do not usually output messages or debug information since outputting debug information can significantly affect boot time of the computing systems. Furthermore, users may not always record output messages from the computing systems. Debug information usually aids in determining the situation where an error arose. Using debug information as guidance, the situation that caused the error can be reproduced on a debug version of the computing system. A release version of the computing system has finite predefined system event logs instead. In a situation where an error or an exception occurs without a corresponding defined system event log, tracing a root cause of the failure can be difficult. Thus, it can be difficult to recreate the situation that caused the error. Without debug information, a user can spend long periods of time trying to debug the issue with the computing system. Release versions of hardware typically do not include debug information output during BIOS operations when the computing system is powered on. As such, errors during the BIOS operations can be difficult for a user to communicate to a remote service technician.

Embodiments of the present disclosure provide systems and methods for capturing information pertaining to BIOS activity for debugging purposes. Although the BIOS is used as an example, some implementations of the present disclosure can be used for any firmware (e.g., a baseboard management controller) that can be debugged.

FIG. 1 illustrates a debugging setup 100 in the prior art. A debug device 102 is connected using a cable 104 to an external device 106. Both the debug device 102 and the external device 106 are computing devices. The debug device 102 outputs messages and debug information. These messages and the debug information can be transmitted via the cable 104 to the external device 106 for analysis. When a user reaches out to a service technician and describes a problem being experienced, the user is usually using a release version of a computing device, and the service technician has access to a debug version of the computing device (i.e., the debug device 102). The service technician uses the debug device 102 to try and recreate the problem the user is experiencing with the release version of the computing device. The release version usually does not generate enough debug information for the service technician, so the user is unable to send, to the service technician, debug information or raw data generated prior to the problem being experienced. The service technician merely has to rely on descriptions from the user.

Figure 2A:
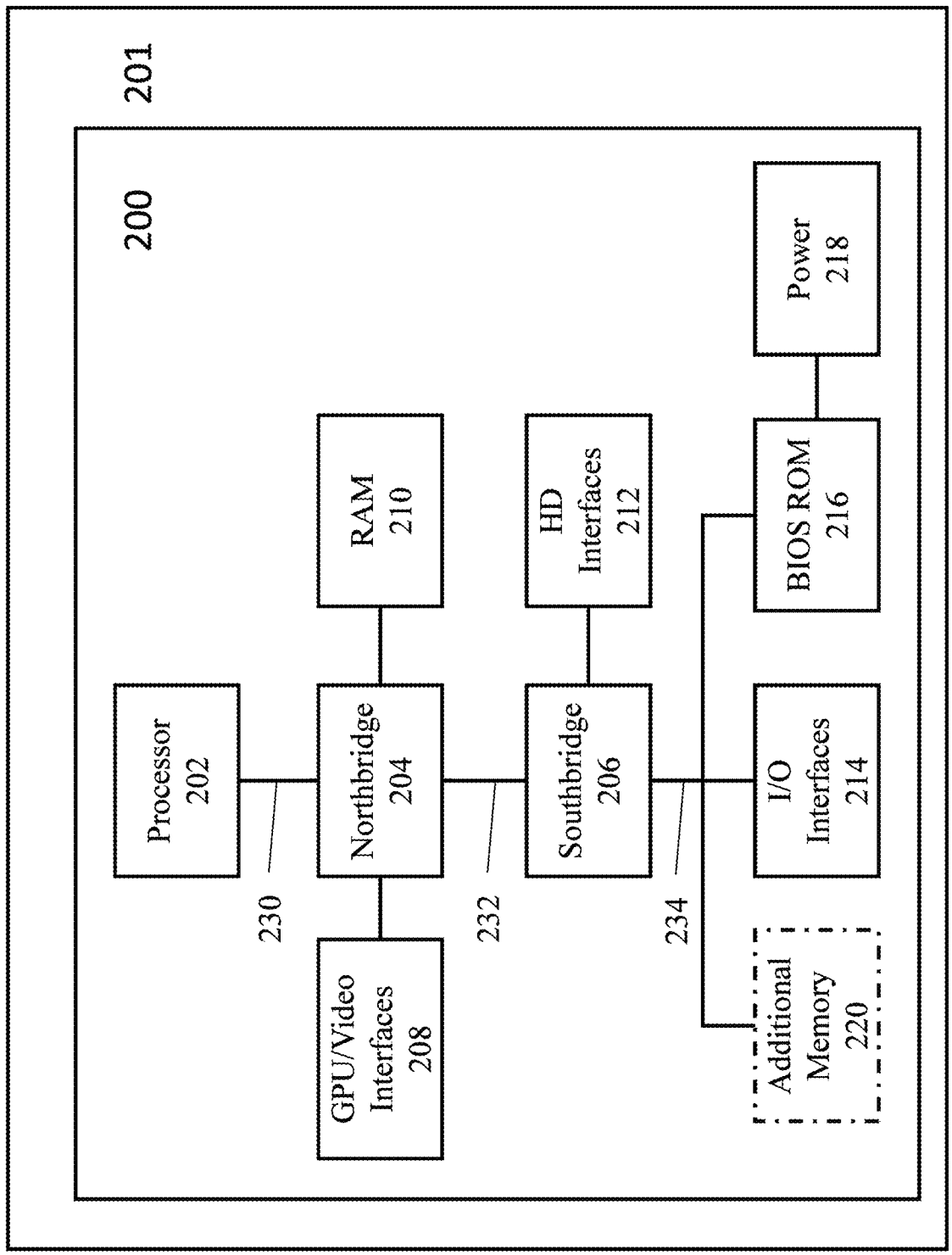
FIG. 2A is a first block diagram of a motherboard, according to some implementations of the present disclosure.

Instead of relying on the user's descriptions to recreate crash or error situations, some implementations of the present disclosure provide storage devices for capturing information that can be provided to a service technician to help in solving the problem. FIG. 2A is a block diagram of a motherboard 200 in an example computing system 201, according to some implementations of the present disclosure. The motherboard 200 is used here as an example. Any type of printed circuit board in an embedded system may benefit from some implementations of the present disclosure. The motherboard 200 operates when power 218 is provided to components in the motherboard 200. The motherboard 200 can include a processor 202, a northbridge 204, and a southbridge 206. The processor 202, although listed as singular, can include multiple processors. The processor 202 can be a general purpose or a special purpose processor, or a microprocessor. The processor 202 can also be a multicore processor.

Figure 2B:
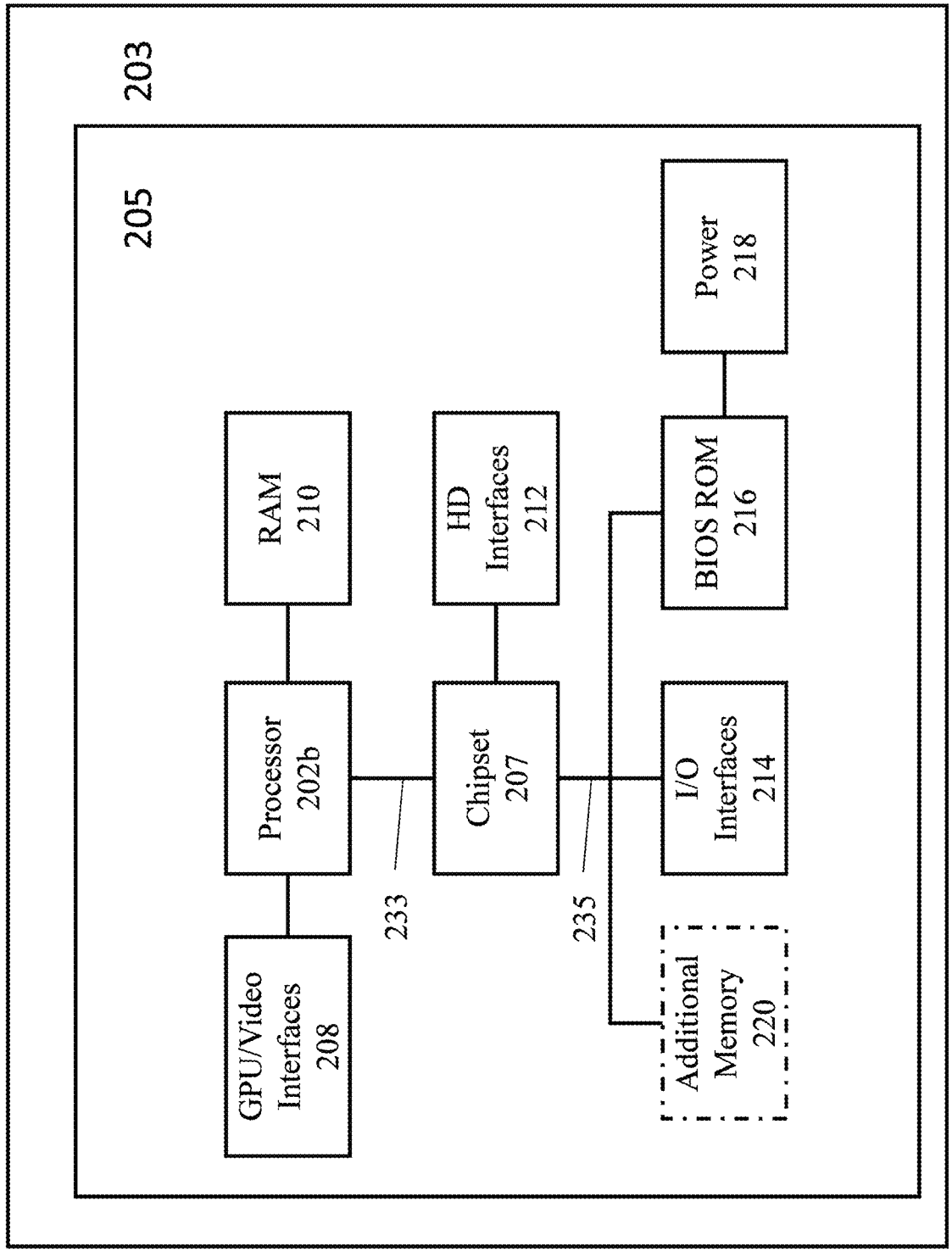
FIG. 2B is a second block diagram of a motherboard, according to some implementations of the present disclosure.

In some implementations, the motherboard 200 does not include the northbridge 204, and functions of the northbridge 204 are performed by the processor 202. FIG. 2B provides an example system 203 with a motherboard 205 that does not include a northbridge and a southbridge, according to some implementations of the present disclosure. Instead, a processor 202b performs functions of the northbridge 204 (FIG. 2A). A chipset 207 is provided to perform similar functions of the southbridge 206 (FIG. 2A). FIGS. 2A and 2B provide examples of motherboard architectures that can benefit from some implementations of the present disclosure. The architectures for motherboards 200, 205 are merely examples and do not limit systems that may benefit from the present disclosure.

Referring to FIG. 2A, the northbridge 204 is a chip that is directly connected to a bus 230 with access to the processor 202. The northbridge 204 connects components that require high speed or high performance when communicating with the processor 202. For example, in FIG. 2A, the motherboard 200 includes a random access memory (RAM) 210 and a graphics processing unit (GPU) and/or video interfaces 208 that are connected to the northbridge 204. The RAM 210 can include dual inline memory modules (DIMMs) of double data rate synchronous dynamic random access memory (DDR SDRAM). The GPU and/or video interfaces 208 allow a monitor or screen (not shown) to connect to the motherboard 200. Video processing and secondary memory access typically require high speed operation and access to the processor 202, hence the GPU and/or video interfaces 208 and RAM 210 are connected to the northbridge 204. In some implementations, examples of the GPU and/or video interfaces 208 include a peripheral component interconnect express (PCIe) interface or an accelerated graphics port (AGP). In contrast, in FIG. 2B, the processor 202b is directly connected to the GPU and/or video interfaces 208 and the RAM 210.

Referring back to FIG. 2A, the southbridge 206 is a chip that is directly connected to northbridge 204 via bus 232 and provides access to components that communicate at a slower speed compared to components connected to the northbridge 204. For example, the southbridge 206 can connect hard disk (HD) interfaces 212, input/output (I/O) interfaces 214, and BIOS read only memory (ROM) 216. The HD interfaces 212 can include serial advanced technology attachment (SATA), integrated drive electronics (IDE), peripheral component interconnect (PCI) interface, etc. The I/O interfaces 214 can include serial ports, parallel ports, keyboard interfaces, mouse interfaces, universal serial bus (USB), Ethernet, audio codec, etc. The BIOS ROM 216 can include a flash ROM, an electrically erasable programmable ROM (EE-PROM), etc. The motherboard 200 includes a bus 234 that allows the BIOS ROM 216 to connect to the southbridge 206.

In contrast, in FIG. 2B, the chipset 207 performs a similar function as the southbridge 206 of FIG. 2A. The chipset 207 is connected to the processor 202b via bus 233 and connects to other interfaces (e.g., the HD interfaces 212, the I/O interfaces 214, etc.). A bus 235 can be used to connect to the other interfaces. Although FIGS. 2A and 2B indicate the BIOS ROM 216, in other implementations, for example, in an embedded system, this may generically be indicated as a firmware ROM.

In some implementations, additional memory 220 (FIG. 2A) can be provided in the motherboard 200 for capturing debug information. The additional memory 220 can be a low-capacity memory for capturing debug information for one or more boot sessions (e.g., two boot sessions, three boot sessions, etc.). By providing the additional memory 220, debug information associated with the BIOS ROM 216 can be captured. For example, when the power 218 is provided to the motherboard 200, the BIOS ROM 216 is initialized first. As the BIOS ROM 216 initiates the boot-up process, debug information is captured on the additional memory 220. If the computing device 201 using the motherboard 200 crashes during a boot session, then the debug information pertaining to the boot session is captured on the additional memory 220. In some examples, the debug information can include protocols and/or software modules being installed or being processed by firmware (e.g., BIOS). The debug information can thus include detailed progress information for the firmware. The debug information can include part(s) of data being updated, by the firmware, into Baseboard Management Controller (BMC), System Management BIOS (SMBIOS) or any other destinations. The debug information can include one or more devices in the system (e.g., the computing system 201, 203) under initialization by the firmware. These aforementioned examples of items in the debug information are not included in system event logs due to the excessive amount of information that is entailed. The system event logs include pre-defined, cognizable events, while the debug information can include minute details of a computing system's operations that do not readily lend to a cognizable pattern.

The additional memory 220 is crucial in some implementations because during BIOS operations, the processor 202 is not yet initialized and running an operating system. The operating system is an advanced software that can capture system event logs for pre-defined events. In some cases, system event logs can serve as the debug information to aid in solving a user's problem. System event logs can be generated throughout different phases of the computing system 200's initialization. For example, prior to the operating system being loaded, the operating system is unable to generate system event logs. Initial system event logs being captured are generated by firmware (e.g., BIOS, BMC, etc.) and can be stored in limited firmware memory (e.g., the BIOS ROM 216). After the operating system is loaded, additional system event logs are then generated by the operating system and can be stored in a hard drive. The firmware memory can be enough to capture the limited system event logs, but may not be enough to capture debug information. Thus, providing the additional memory 220 on the motherboard 200 allows capturing of the debug information related to activities associated with the BIOS ROM 216. Otherwise, contextual information concerning BIOS activities (e.g., power-on self-test (POST) activities) are not captured, and are not available for debugging when the user encounters a problem. Providing the additional memory 220 can reduce cost and time associated with a service technician helping the user solve a problem.

Providing the additional memory 220 simplifies the design of the computing system 201 that provides the debug information. The prior art setup 100 of FIG. 1 requires an external device 106 that captures the debug information generated by the debug device 102. The debug device 102 requires special firmware and is different from release versions of the computing system 201. Therefore, the debug device 102 is not identical to the release version and there can be differences between what the user is experiencing and communicating to the service technician, and what the service technician is able to recreate with the debug device 102. The special firmware on the debug device 102 outputs the debug information as the debug information is being generated.

Some implementations of the present disclosure do not require the external device 106 to capture the debug information. Furthermore, no special firmware, cable, or debug device are necessary to access the debug information.

The additional memory 220 in FIG. 2A is preferably a non-volatile storage device. In the event of a crash or a system reset, a volatile storage device can lose data, but a non-volatile storage device prevents data loss. Examples of the additional memory 220 include NOR flash, EEPROM, non-volatile DIMM, data center persistent memory modules (DCPMMs), non-volatile RAM, etc. A non-volatile storage device is preferred because the debug information, once stored, can be accessed at any time, without having to enable a special debug firmware. With the additional memory 220 installed, the cable 104 in FIG. 1 is no longer necessary to capture the debug information.

Figure 3:
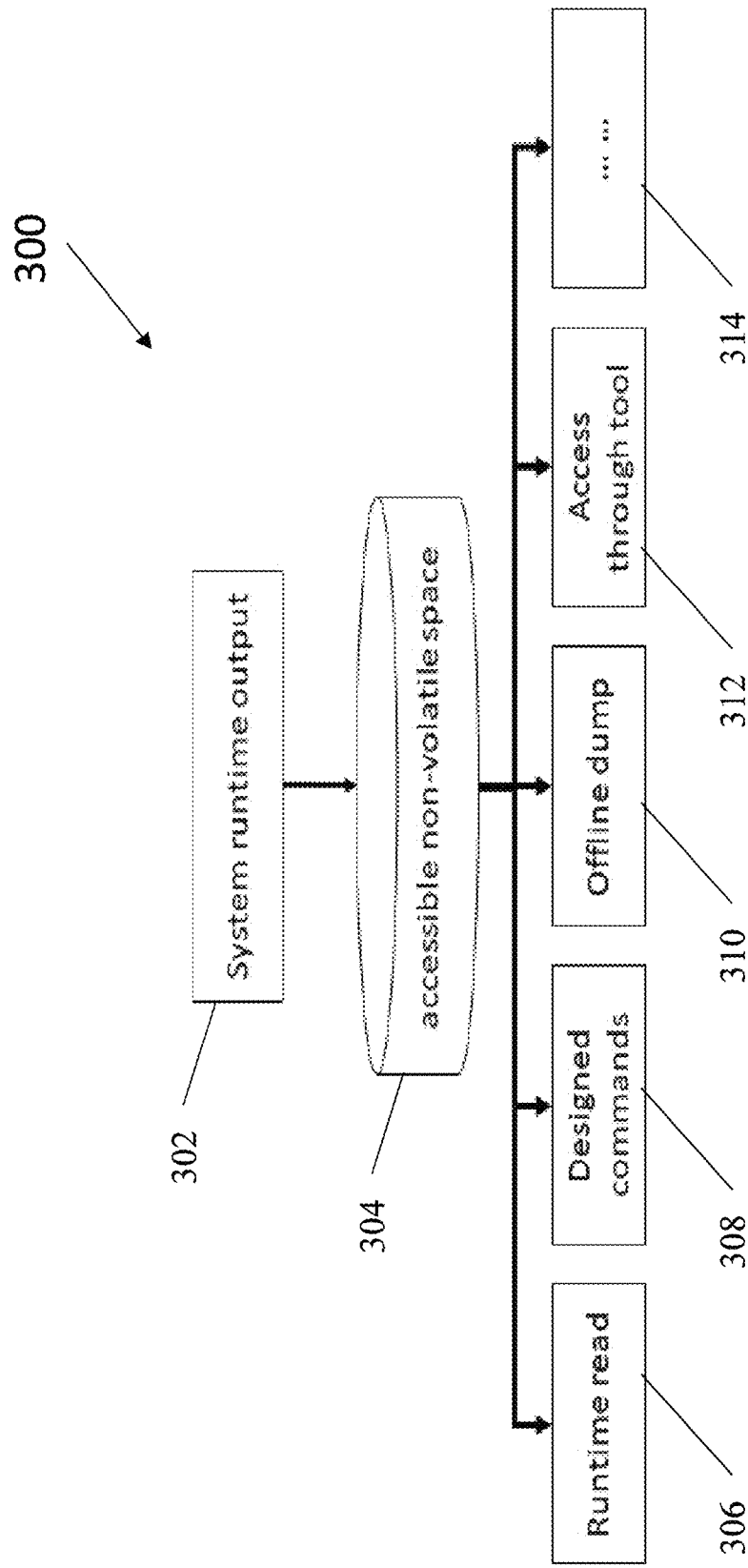
FIG. 3 is flow diagram illustrating accessing stored debug information, according to some implementations of the present disclosure.

FIG. 3 is flow diagram 300 illustrating how the stored debug information is accessed, according to some implementations of the present disclosure. For example, the computing system 201 (FIG. 2A) with the motherboard 200 (FIG. 2A) provides a system runtime output 302 while in operation. The system runtime output 302 can include: (i) debug information obtained prior to loading the operating system of the computing system 201; (ii) debug information and system event logs after the operating system of the computing system 201 is loaded; or both (i) and (ii). The system runtime output 302 is stored in an accessible non-volatile space 304. The accessible non-volatile space 304 can include one or more memory devices (e.g., the additional memory 220 of FIG. 2A for debug information obtained prior to loading the operating system, one or more hard drives connected to the HD interfaces 212 and/or U/O interfaces 214, etc.). The system runtime output 302 is stored in the accessible non-volatile space 304 until ready to be used.

The system runtime output 302, stored in the accessible non-volatile space 304, can be accessed using a runtime read operation 306, designed commands 308, an offline dump 310, an access through tool 312, or any other method 314. The method for accessing the system runtime output 302 depends on the type of device that encompasses the accessible non-volatile space 304. The runtime read operation 306 involves displaying or accessing the stored system runtime output 302 on the accessible non-volatile space 304 during runtime, as the output 302 is generated. In some implementations, an spi_read( ) function, for example, is used to obtain the stored system runtime output 302 from the accessible non-volatile space 304. The spi_read( ) function accesses the specific memory device (e.g., the additional memory 220 of FIG. 2A or FIG. 2B) where the system runtime output 302 is stored. The spi_read( ) function can be called during the runtime read operation 306. In some implementations, designed commands 308 are used. Designed commands 308 are analogous to a modified spi_read( ) function or some other customized read function. In some implementations, the offline dump 310 involves accessing raw data dump image files on the non-volatile space 304. In some implementations, the access through tool 312 involves having a tool (e.g., a debug tool) that allows settings or data from the non-volatile space 304 to be dumped to a storage device (e.g., a serial parallel interface flash device) or printed on paper or on-screen using a system or firmware interface. The non-volatile space 304 allows the service technician to access the debug information and other messages on the user's machine. The debug information can be accessed by the service technician using a network interface of the user's machine.

FIG. 4A illustrates a memory state of the additional memory 220 after a first boot session, and FIG. 4B illustrates the memory state of the additional memory 220 and after a second boot session, according to some implementations of the present disclosure. The type of memory chosen as the additional memory (e.g., the additional memory 220 of FIG. 2B) can have implications on read and write speed, capacity, etc. In some implementations, the additional memory 220 (FIG. 2B) can hold the debug information for a finite number of boot sessions (e.g., two boot sessions, three boot sessions, etc.). A state 400 of the additional memory 220 is an example memory state after storing the debug information for a first boot session. The debug information for the first boot session is stored between a first memory location 402 and a second memory location 404. In the state 400 of the additional memory 220, memory locations after the second memory location 404 do not store any information.

As shown in FIG. 4B, after the second boot session, the state of the additional memory 220 changes from the state 400 to state 401. The debug information for the second boot session is stored starting from a third memory location 406. The additional memory 220 does not have enough free space to store all the debug information of the second boot session, so a first part of the debug information for the first boot session is overwritten. The debug information for the second boot session is thus stored between the third memory location 406 and a fourth memory location 408. A second part of the debug information for the first boot session, not overwritten, is left on the memory between a fifth memory location 410 and the second memory location 404. The next time the memory is written to, for example, for a third boot session, debug information for the third boot session will start from the fifth memory location 410.

In some implementations, preserving the last part or portions of the debug information is valuable because during boot sessions, the most recent data in time can be more valuable than earlier data. For example, while a computing system is booting up and an exception is thrown, the last part of the debug information being written to memory will pertain to the thrown exception and any steps leading to or prior to the thrown exception. Data written earlier than the data pertaining to the thrown exception can be less important as duration between the earlier written data and the data pertaining to the thrown exception increases. For example, while booting sequentially, USB controllers were first initialized and initialed correctly, SATA controllers were then initialized and initialized correctly, but fan controllers, next in line for initialization, failed to initialize. During a next boot session, data pertaining to successful initialization of the USB controllers are overwritten, but the data pertaining to the fan controllers, being stored later, are not overwritten. As such, the error is preserved by merely determining a memory storage scheme for writing to the additional memory 220 (FIG. 2B). FIGS. 4A and 4B provide a memory device with enough capacity to store debug information for one boot session and part of a second boot session. This is merely used as an example and is dependent on capacity of the memory device.

EEPROM is known to have limited storage capacity, and as such, can use the storage scheme provided in FIG. 4. In some implementations, NOR flash and EEPROM are desirable because these memory devices do not have to wait for other devices to initialize, and so they can be available for storing debug information once power is turned on. Furthermore, the NOR flash and EEPROM do not require additional chipset and/or device. Generally, in the prior art setup 100 of FIG. 1, BIOS debug message output to the external device 106 (FIG. 1) is limited by a baud rate upper bound of about 14 kilobytes (KB) per second. For example, AMI BIOS outputs about 1.8 megabytes (MB) of debug information, which adds about 165 seconds to a POST process. Slow output speed for communicating debug information to the external device 106 (FIG. 1) is a bottleneck of the setup 100 of FIG. 1.

Adding the additional memory 220 (FIG. 2B) to store debug information can provide a performance increase over two to three times compared to the prior art setup 100 of FIG. 1. FIG. 5 is a table providing comparison of boot times between different device setups, according to some implementations of the present disclosure. The debug BIOS pertains to the prior art setup 100 of FIG. 1, where POST time takes about 3 minutes 45 seconds and an output of about 1.8 MB of debug information. The formal BIOS pertains to a release version where POST time will take about 1 minute but outputs no debug information. As seen, providing debug information can increase boot time almost 4×.

Some setups try to cast a balance between the debug BIOS and the formal BIOS by having a partial debug BIOS that does not output as much information and yet has an acceptable POST time. The partial debug BIOS is shown to output about 0.3 MB with a POST time of about 1 minute 30 seconds. Generating output to the external device 106 (FIG. 1) can significantly impact POST times as indicated. Output speed of communicating debug information in FIG. 5 is about 1 KB/s. By adopting some implementations of the present disclosure, debug messages can be stored using a faster interface, thus avoiding the bottleneck associated with the setup 100 of FIG. 1. For example, the inter-integrated circuit ($I^2C$) protocol can provide write speeds of up to 625 KB/s. Use of NOR flash can provide speeds up to 110 KB/s. Enhanced serial peripheral interface (eSPI), memory-mapped/O (MMIO), etc., can be faster than NOR flash. As such, using EEPROM with these interfaces can allow storing 1.8 MB of debug information while keeping the POST times comparable to the partial debug BIOS. For example, a formal BIOS with EEPROM can provide an expected POST time of about 1 minute 45 seconds. The expected POST time provided in FIG. 5 can change based on the type of memory device being used to capture the debug information.

Embodiments of the present disclosure provide an improvement over conventional systems in that debug information and messages can be generated without a cable (e.g., the cable 104 of FIG. 1) being installed. Debug information and messages are usually unavailable for probing without the setup 100 of FIG. 1. Thus, embodiments of the present disclosure provide additional memory (e.g., the additional memory 220) for capturing this information. Since the information is saved on a non-volatile space, the debug information and the generated messages can be accessed in different ways, depending on the type of memory used to save the information.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A system comprising:
 a processor;
 a firmware read only memory (ROM); and
 a non-volatile memory device separate from the firmware ROM, the non-volatile memory device coupled to the firmware ROM via a shared bus, the non-volatile memory device being configured to store debug information from the firmware ROM using the shared bus, prior to running an operating system on the processor.

2. The system of claim 1, further comprising:
   a chipset coupled to the processor via a first bus and coupled to the firmware ROM and the non-volatile memory device via a second bus.

3. The system of claim 1, wherein the non-volatile memory device is an electrically erasable programmable ROM or a NOR flash ROM.

4. The system of claim 1, wherein the debug information is stored in consecutive memory locations on the non-volatile memory device.

5. The system of claim 4, wherein the debug information includes first debug information from a first boot session and second debug information from a second boot session, wherein the first debug information stored on the non-volatile memory device is partially overwritten by the second debug information.

6. The system of claim 1, wherein the debug information includes an offline dump.

7. The system of claim 1, further comprising:
   a network interface configured to send the debug information on the non-volatile memory device to an external device.

8. The system of claim 1, further comprising:
   a second memory device having a higher capacity than the non-volatile memory device, the second memory device configured to store system event logs generated by the operating system.

9. The system of claim 8, wherein the second memory device includes a random access memory, a hard drive, or both.

10. The system of claim 1, wherein the firmware ROM is a basic input output system (BIOS) ROM.

11. An embedded system, comprising:
    a microprocessor;
    a firmware read only memory (ROM); and
    a non-volatile memory device separate from the firmware ROM, the non-volatile memory device coupled to the firmware ROM via a shared bus, the non-volatile memory device configured to store debug information from the firmware ROM using the shared bus, prior to initializing the microprocessor.

12. The embedded system of claim 11, wherein the non-volatile memory device is an electrically erasable programmable ROM or a NOR flash ROM.

13. The embedded system of claim 11, wherein the debug information is stored in consecutive memory locations on the non-volatile memory device.

14. The embedded system of claim 13, wherein the debug information includes first debug information from a first boot session and second debug information from a second boot session, wherein the first debug information stored on the non-volatile memory device is partially overwritten by the second debug information.

15. A method for storing debug information on a computing system, comprising: generating debug information using a firmware read only memory (ROM) of the computing system; storing the generated debug information on a non-volatile memory device of the computing system, the non-volatile memory device being separate and accessible by the firmware ROM via a bus shared at lean by the non-volatile memory device and the firmware ROM; and sending the stored debug information to an external device using a network interface of the computing system.

16. The method of claim 15, wherein the debug information is stored in consecutive memory locations on the memory device.

17. The method of claim 16, further comprising:
    generating subsequent debug information using the firmware ROM, wherein the deb g information was generated in a first boot session and the subsequent debus information is generated in a second boot session; and
    storing the subsequent debug information by partially overwriting the debug information.

18. The method of claim 15, wherein the non-volatile memory device is an electrically erasable programmable ROM or a NOR flash ROM.

19. The method of claim 15, wherein the firmware ROM is a basic input output system (BIOS) ROM.

* * * * *